United States Patent
Wynn et al.

(10) Patent No.: US 11,394,079 B2
(45) Date of Patent: Jul. 19, 2022

(54) BATTERY CELL PACK THERMAL RUNAWAY MITIGATION

(71) Applicant: Rivian IP Holdings, LLC, Plymouth, MI (US)

(72) Inventors: Nathaniel C. Wynn, Tustin, CA (US); Vignesh Sekar, Westland, MI (US); Tyler Collins, Irvine, CA (US); Kyle Butterfield, Rancho Santa Margarita, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 4 days.

(21) Appl. No.: 16/680,317

(22) Filed: Nov. 11, 2019

(65) Prior Publication Data

US 2020/0152941 A1    May 14, 2020

Related U.S. Application Data

(60) Provisional application No. 62/760,646, filed on Nov. 13, 2018.

(51) Int. Cl.
*H01M 50/30* (2021.01)
*H01M 50/20* (2021.01)

(52) U.S. Cl.
CPC .......... *H01M 50/30* (2021.01); *H01M 50/20* (2021.01)

(58) Field of Classification Search
CPC .... H01M 50/30; H01M 50/20; H01M 50/147; H01M 50/35
See application file for complete search history.

(56) References Cited

U.S. PATENT DOCUMENTS

2011/0174556 A1   7/2011   Hermann et al.
2012/0164490 A1*  6/2012   Itoi ................... H01M 10/6566
                                            429/7

(Continued)

FOREIGN PATENT DOCUMENTS

KR         20170069003 A   *  6/2017   ............. Y02E 60/10

OTHER PUBLICATIONS

PETG vs. PP Homopolymer, 2020, Makeitfrom.com, Material Properties Database, https://www.makeitfrom.com/compare/Glycol-Modified-Polyethylene-Terephthalate-PETG-PET-G/Polypropylene-PP-Homopolymer (Year: 2020).*

(Continued)

*Primary Examiner* — Maria Laios
*Assistant Examiner* — Adam J Francis
(74) *Attorney, Agent, or Firm* — Haley Guiliano LLP

(57) ABSTRACT

Systems and methods are described herein for venting battery cells in a battery cell pack assembly. An assembly includes a matrix configured to hold battery cells and channel assemblies that each include a venting channel for venting materials (e.g., flammable gas and conductive particulates) from the interior of the matrix to an outlet. Battery cells, particularly lithium ion battery cells, have a chance of entering a thermal runaway condition that causes the production of flammable gas. The assembly is configured such that battery cells are allowed to vent such flammable gas out of the assembly. A ventilation opening and channel in the assembly cause venting materials to be routed through and out of the assembly.

20 Claims, 7 Drawing Sheets

(56) References Cited

U.S. PATENT DOCUMENTS

| | | | |
|---|---|---|---|
| 2012/0263995 A1* | 10/2012 | Naito | H01M 50/308 |
| | | | 429/146 |
| 2013/0095356 A1* | 4/2013 | Shimizu | H01M 50/317 |
| | | | 429/88 |
| 2013/0095393 A1* | 4/2013 | Friesen | H01M 50/394 |
| | | | 429/404 |
| 2013/0263442 A1 | 10/2013 | Favaretto | |
| 2014/0205878 A1 | 7/2014 | Ohgitani et al. | |
| 2015/0044530 A1* | 2/2015 | Koch | H01M 50/394 |
| | | | 429/82 |
| 2016/0218336 A1 | 7/2016 | Herrmann et al. | |
| 2019/0393473 A1* | 12/2019 | Peluso | H01M 50/529 |

OTHER PUBLICATIONS

English Translation of KR20170069003A; Smasung SDI Co LTD, Jun. 20, 2017, Battery Module (Year: 2017).*
International Search Report and Written Opinion of PCT/US2019/060773 dated Feb. 28, 2020.

* cited by examiner

BATTERY CELL PACK THERMAL RUNAWAY MITIGATION

CROSS REFERENCE TO RELATED APPLICATION

This application claims the benefit of U.S. Provisional Patent Application No. 62/760,646, filed Nov. 13, 2018, the disclosure of which is hereby incorporated by reference herein in its entirety.

The present disclosure is directed to venting battery cells, and more particularly towards an assembly having ventilation outlets for venting the battery cells.

SUMMARY

Lithium ion battery cells have a very low chance to randomly enter a thermal runaway condition. However, when this happens, their internal burst discs will open and let out gas that is flammable and might be actively on fire (on the order of 50 L at 1400 C in 2 seconds), and depending on cell age, chemistry, and state of charge, might be corrosive as well primarily due to hydrogen fluoride. In addition, conductive particulates, such as carbon and metallics are being carried by this gas. Depending on the battery cell pack and its constituent module structures, this might increase the temperature sufficiently to take other battery cells into a thermal runaway condition ("thermal propagation"), increase the pressure sufficiently to damage seals or structure (e.g., on the order of 300 mbar), cause isolation failures, corrode electrical contacts, etc.

One aspect of the present disclosure is directed to an assembly having a ventilation outlet for venting battery cells. The assembly includes a matrix that is configured to hold the battery cells, where the matrix includes a front side, a rear side, and two lateral sides opposite each other. The assembly further includes a channel assembly that is both coupled to one of the two lateral sides and includes at least one venting channel. The assembly further includes an outlet that is coupled to the channel assembly. The matrix includes openings along one of the lateral sides for the battery cells. The battery cells are each arranged to vent into a respective one of the openings. The channel assembly interfaces with the openings such that venting from the matrix propagates into the at least one venting channel. Both the channel assembly and the outlet are configured to cause venting to propagate to and out of the outlet.

In some embodiments, the assembly includes a first and second lateral side, a first and second channel assembly, and a first and second outlet. The second channel assembly may be coupled to the second lateral side of the two lateral sides. The second channel assembly comprises at least one venting channel and interfaces with openings along the second lateral side such that venting from the matrix propagates into the at least one venting channel of the second channel assembly. The second outlet may be coupled to the second channel assembly. The second channel assembly and the second outlet are configured to cause venting to propagate to and out of the second outlet. The first and second outlets may be arranged on respective ones of the two lateral sides proximate to the rear side of the matrix. The first and second channel assemblies are coupled to a respective one of the two lateral sides and each comprise at least one venting channel. The first and second outlets are each coupled to a respective one of the first and second channel assemblies. The first and second outlets may be arranged on respective ones of the two lateral sides proximate to the front side of the matrix. In some embodiments, the assembly includes two additional outlets, each coupled to a respective one of the first and second channel assemblies and arranged on respective ones of the two lateral sides such that outlets are arranged on lateral sides proximate to both the front and rear sides. In some embodiments, the matrix includes walls that each extend from the first of the two lateral sides to the second of the two lateral sides. The walls are arranged such that at least one battery cell is arrangeable between two consecutive walls. Venting of the at least one battery cell is substantially confined to between the two consecutive walls. In some embodiments, the consecutive walls each include a wall opening configured to receive a current collector. The at least one battery cell may include two battery cells that are arrangeable between the consecutive walls back to back. In some embodiments, the openings of the matrix are configured to be one-way ports that direct venting outwardly. The assembly may further include a plastic spacer that is configured to maintain relative positions of the battery cells.

Another aspect of the present disclosure is directed to a battery cell pack assembly. The battery cell pack assembly includes battery cells that each include a front end and a back end, where each of the battery cells are configured such that venting propagates out of the front end. The venting assembly includes two lateral sides opposite each other configured to receive venting from any of the battery cells and to direct the venting outwards of the battery cells and along the two lateral sides. The battery cell pack may further include a cover layer of low-strength, low-flammability plastic arranged in front of the front end such that venting is directed towards the cover layer. In some embodiments, the battery cell pack includes a lid that is configured to withstand flames arranged in front of the cover layer.

Another aspect of the present disclosure is directed to a method for venting gas in a battery module through an assembly that includes a matrix configured to hold battery cells, a channel assembly, and an outlet. Venting gas of a ventilating battery cell of the battery cells held by the matrix is directed towards a side of the matrix. Venting gas is caused to be propagated from the matrix to the channel assembly via a respective opening in the matrix. The venting gas is caused to be propagated through the channel assembly to and through the outlet. In some embodiments, the matrix includes a front side, a rear side, and two lateral sides opposite each other. In some embodiments, the channel assembly includes a first channel assembly, and the first assembly and a second assembly are each coupled to a respective one of the two lateral sides. The assembly may include openings along the two lateral sides. The matrix may include walls that each extend from one of the two lateral sides to another of the two lateral sides. In some embodiments, the walls are arranged such that at least one battery cell of the battery cells is arrangeable between two consecutive walls and venting the at least one battery cell is substantially confined to between the two consecutive walls. The at least one battery cell may include two battery cells that are arrangeable between the consecutive walls back to back. In some embodiments, the respective opening is configured to be a one-way port that directs venting outwardly.

It should be noted that the systems, methods, apparatuses, and/or aspects described above may be applied to, or used in accordance with other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DESCRIPTION

The present disclosure provides features to allow battery cells to vent. The battery cells are held within a matrix. In some embodiments, the relative positions of the battery cells within the matrix are maintained by a spacer that leaves the top of the battery cell exposed. The top end of the battery cell comprises a button (e.g., a flat concentric surface at the top end of a cylindrical battery cell). An electrical connection is electrically coupled to the button. In some embodiments, the majority of the button is covered by a foil electrical connection. The majority of the venting path passes around the button. Above the electrical connection is a thin (e.g., 0.5 mm) cover layer (e.g., a battery module housing) of low-strength (e.g., 50 MPa at room temperature, <1 MPa at 100 C) low flammability (e.g., UL-94V2) plastic, that may substantially include, for example, glycol-modified polyethylene terephthalate (PETG). Above this cover layer is a lid (e.g., a battery pack lid) that is capable of mechanically withstanding the direct gritty flame/gas jet, and of withstanding the fire temperature itself. When a battery cell vents, it will sever the electrical connection and blow through the cover (e.g., a battery module housing) above the cell. When the venting spreads out after impacting the lid, the cover will prevent the corrosives, conductive media, and any flame from adversely impacting cells, voltage taps, electrical connectors, etc.

Electrical connections between the major components of a battery cell pack (e.g., between battery modules) are routed down the middle of the pack. The ventilation openings to the greater pack structure are outboard. Therefore, the corrosives, conductive media, and flame will preferably spread outboard. To avoid impacting pack egress, ventilation output is routed through one or more openings in the battery cell pack side extrusion, with a larger ventilation opening into, for example, the rear wheel wells. This also provides redundant seals to minimize water intrusion in the event of a leak. In some embodiments, the ventilation openings into the siderail are one-way ports (e.g., using a one-way valve) and prevent hot/corrosive/etc. media from entering adjacent pack cavities. The majority of the passage between adjacent battery modules in which the battery cells are positioned (e.g., within a pack cavity) is blocked off by structural dips in the lid, the cooling manifold, and the front-to-back high voltage busbars. Walls extending from lateral side to opposing lateral side of the battery cell pack also serve to isolate the pack cavities. There is a sufficiently large space between the battery module and the adjacent siderail, to enable vented material from the bottom or top submodule of the battery module to enter the siderail extrusion (e.g., when submodules are arranged back to back).

Figure 1:
FIG. 1 is a top perspective view of a battery module undergoing ventilation in accordance with at least some embodiments of the present disclosure.

FIG. 1 is a top perspective view of a battery module 100 undergoing ventilation in accordance with at least some embodiments of the present disclosure. As shown, battery module 100 includes a spacer 110 that, in some embodiments, maintains the relative positions of battery cells 101 and 102. The button of battery cell 101 is electrically coupled to a busbar 115 in the assembly via foil electrical connection 103. The rim of battery cell 101 is electrically coupled to another busbar on the opposite side of the top of the battery cell. In the view of FIG. 1, this electrical connection is not visible. Although not depicted in this view, a cover layer (e.g., a battery module housing) may be over the battery cells and a pack lid may be over the cover layer. Arrows 104 indicate the venting path of vented materials, heat, and flame coming out from the top face of battery cell 101 from the area surrounding the button. It will be understood that the vented materials are not depicted in FIG. 1 because they would obscure the view. The vented materials traveling in the direction of arrows 104 may sever foil electrical connection 103 such that battery cell 101 is no longer electrically coupled to the busbar in the assembly. The vented materials, in some embodiments, damages the cover layer over the battery cells. In some embodiments, the vented materials contact the pack lid and are subsequently propagated out of the matrix.

Figure 2:
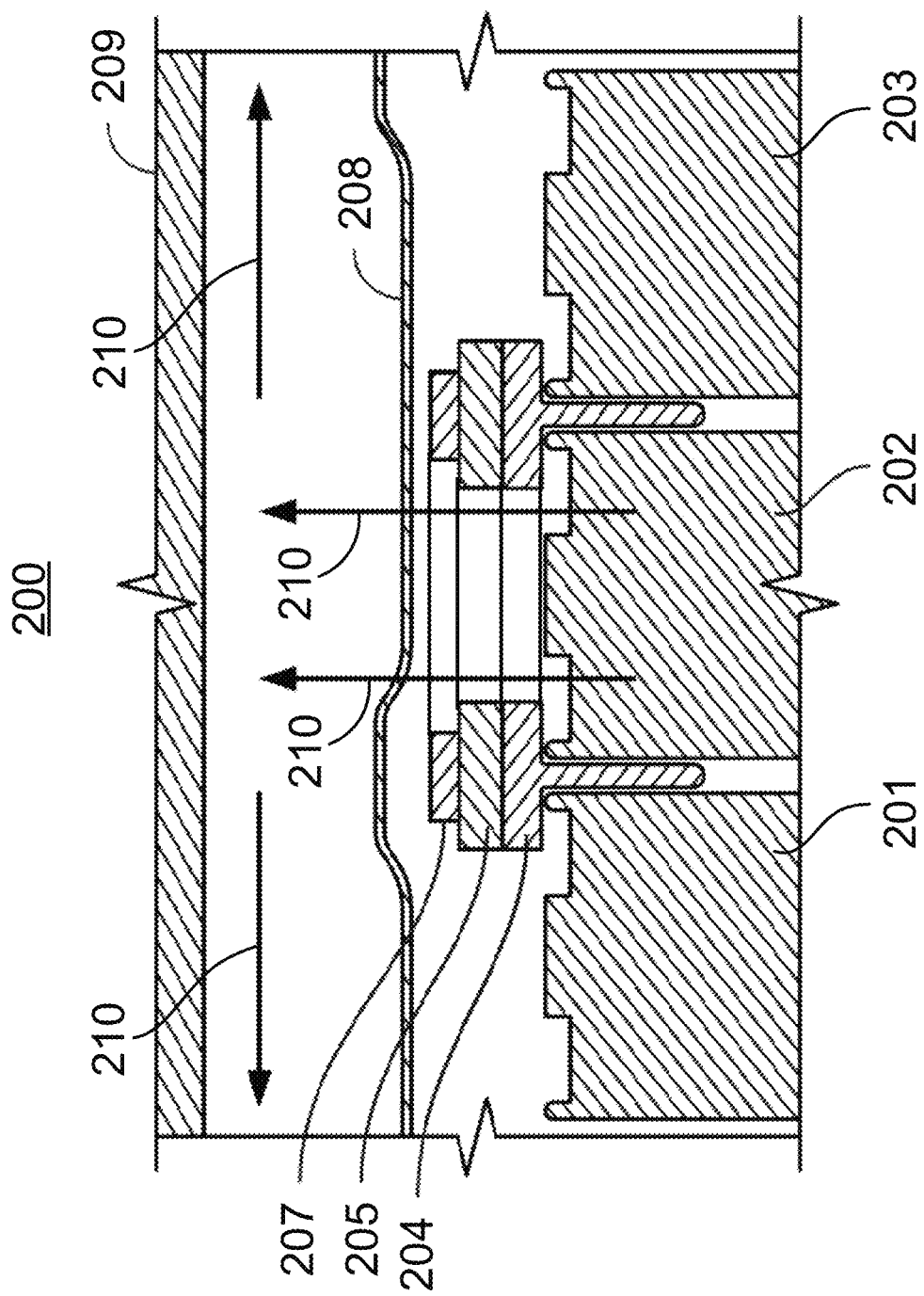
FIG. 2 illustrates a cross-sectional view of battery cells venting through a cover layer and a lid in accordance with at least some embodiments of the present disclosure.

FIG. 2 is a partial cross-section view of battery module 200 undergoing ventilation in accordance with at least some embodiments of the present disclosure. In some embodiments, the electrical connection on the button (e.g., an electrical connection, although not shown in FIG. 2, that electrically couples battery cell 202 to busbar 205) will be severed in a thermal runaway situation that causes the venting to occur. In some embodiments, spacer 204 rests over battery cells 201 and 202 to maintain the spacing and position of battery cells 201 and 202. Busbar 205, extending over the battery cells, may be electrically coupled to battery cell 201 and/or battery cell 202. In some embodiments, busbar 205 is one of a plurality of busbars spaced along the top and bottom of a battery module having both a top side and a bottom side. Vented materials, indicated by arrows 210, travel out towards cover layer 208. Nonconductive structural layer 207 covers the busbars to provide electrical insulation and at least some structural rigidity to the busbar assembly. In some arrangements, structural layer 207 may be impacted by vented materials. Spacer 204, busbar 205, and structural layer 207 are depicted using hatching where the cross-section has divided sections and without hatching where they are not dividing sections (e.g., an extension of the busbar deeper within battery module 200). Although not depicted, a spacing mechanism 204, busbar 205, and structural layer 207 may also be present to the left (e.g., between battery cell 201 and another battery cell (not depicted) further to the left) and to the right (e.g., between battery cell 203 and another battery cell (not depicted) further to the right). Vented materials travel in the direction of arrows 210 through cover layer 208 towards pack lid 209, which diverts the flow of vented materials.

Figure 3:
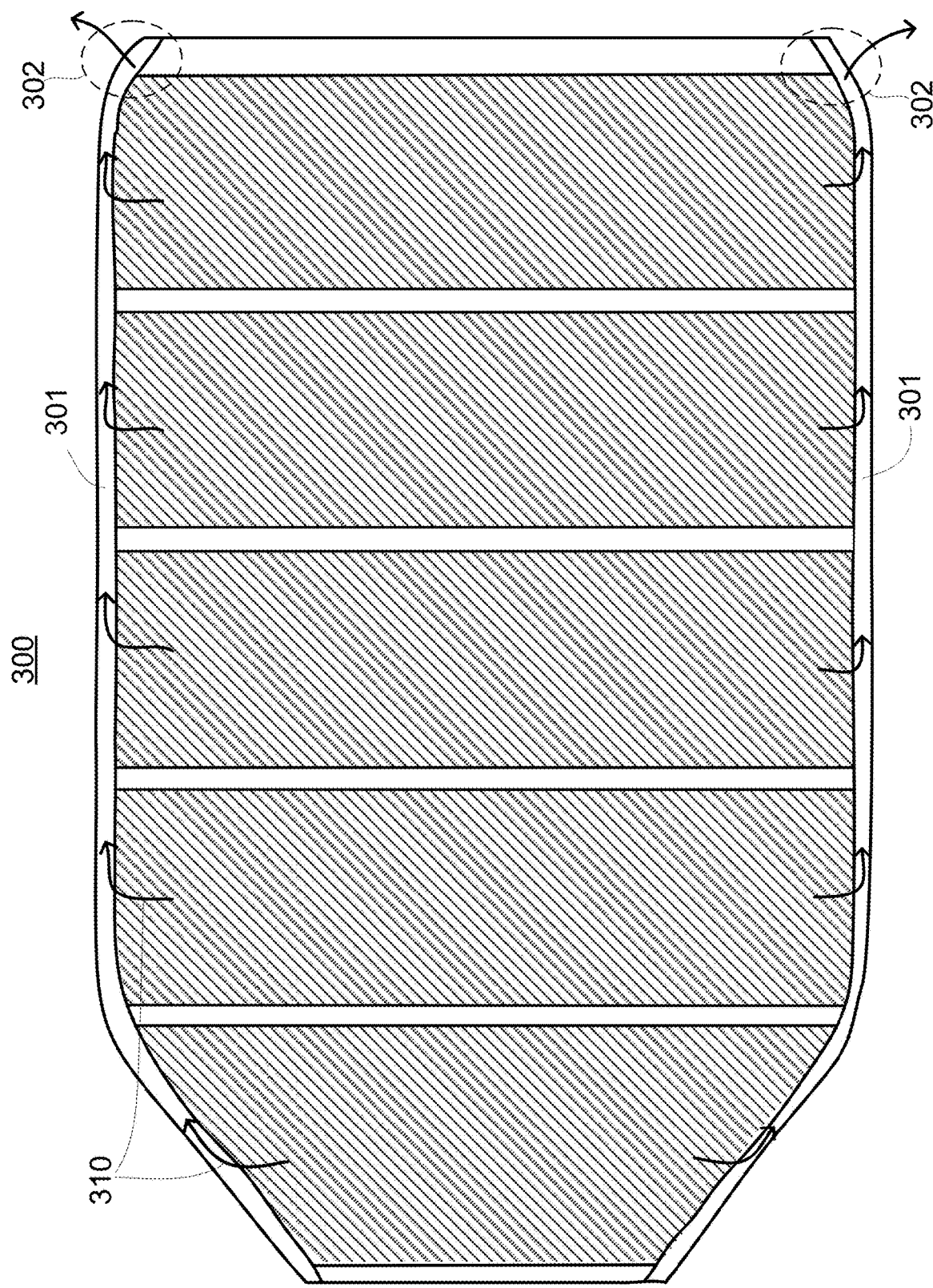
FIG. 3 illustrates a top view of an illustrative battery cell pack assembly in accordance with at least some embodiments of the present disclosure.

FIG. 3 is a top view of illustrative battery cell pack assembly 300 in accordance with at least some embodiments of the present disclosure. Arrows 310 indicate the flow of battery cell venting from battery modules (not shown) contained in respective cavities of pack assembly 300. The cavities are defined by walls running from one lateral side to the other. Each lateral side is a siderail (e.g., siderails 301) through which the venting is routed. For example, venting is routed from the battery modules through siderails 301 and through outlets 302. Two outlets, in some embodiments, are arranged on both lateral sides (e.g., near the front, rear, or both front and rear of the assembly). The tapered side is a front side of a vehicle. The opposite side to the tapered side is a rear side of the vehicle.

Figure 4:
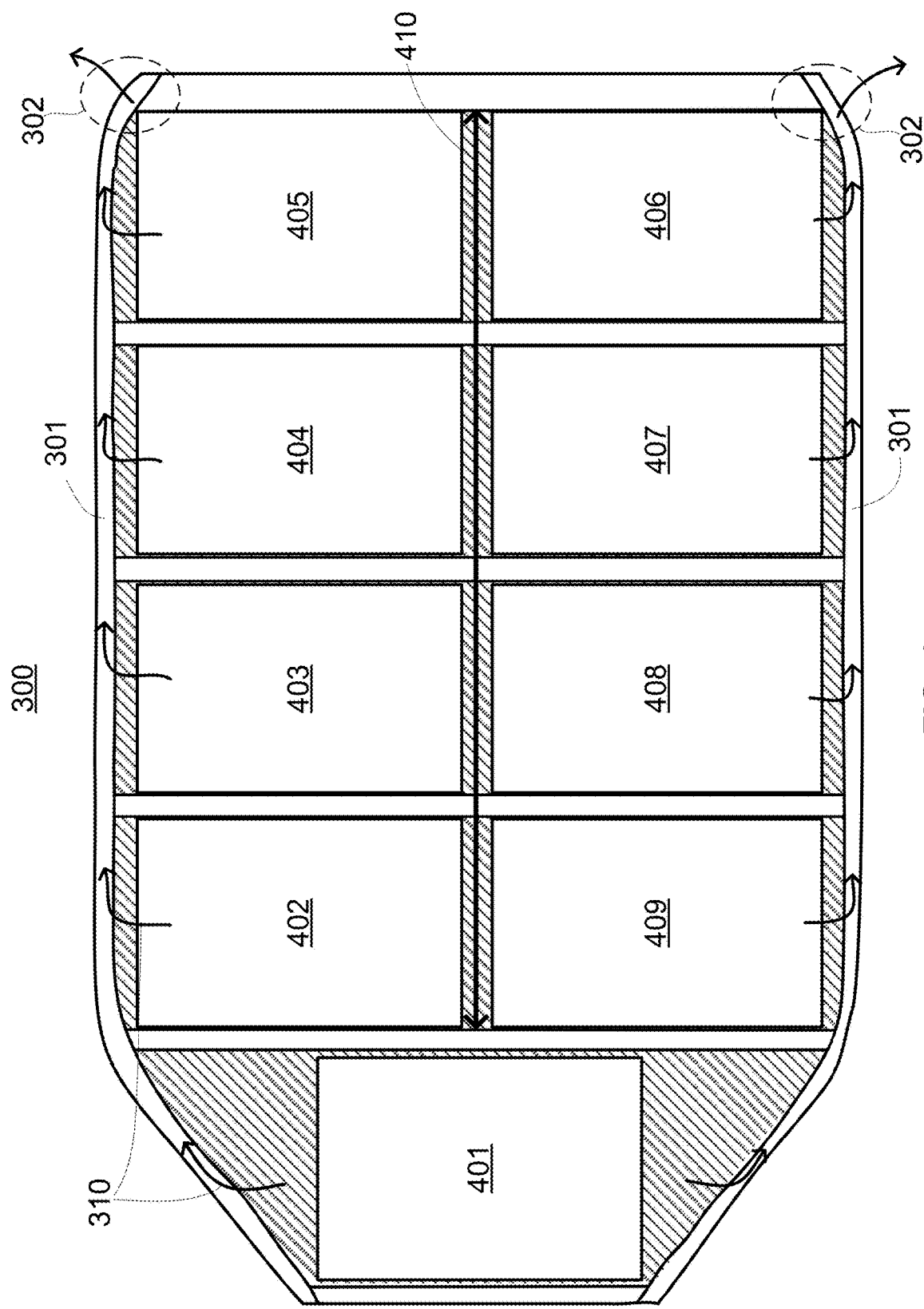
FIG. 4 illustrates a top view of the illustrative battery cell pack assembly of FIG. 3 with additional details in accordance with at least some embodiments of the present disclosure.

FIG. 4 is a top view of illustrative battery cell pack assembly 300 of FIG. 3 with additional details in accordance with at least some embodiments of the present disclosure. The battery modules 401-409 are shown. Electrical connections run through the center of the pack assembly (e.g., as indicated the location of double-sided arrow 410). The arrows (e.g., arrows 310) depict venting routed outboard through the siderails. The rear side is shown as having outlets 302 that allows for the venting to be routed out of the battery cell pack assembly 300. It will be understood that outlets can be located anywhere along siderails 301, at the front side of the battery cell pack, at the rear side of the battery cell pack, or any combination thereof. Venting is routed in accordance with where the outlet(s) is/are located. Routing can be accomplished through the physical structure of the battery cell pack assembly (e.g., through bends, dips, valves, any other suitable physical feature, or any combination thereof) as well as through pressure differences, or both. In a thermal runaway situation, as venting is taking place, pressure is building inside the battery pack (or at least in the cavity of the battery module experiencing the venting). This pressure will be greater than atmosphere, causing the venting to be routed to the outlets. In this way, the openings are configured to be one-way ports that direct venting outwardly.

Figure 5A:
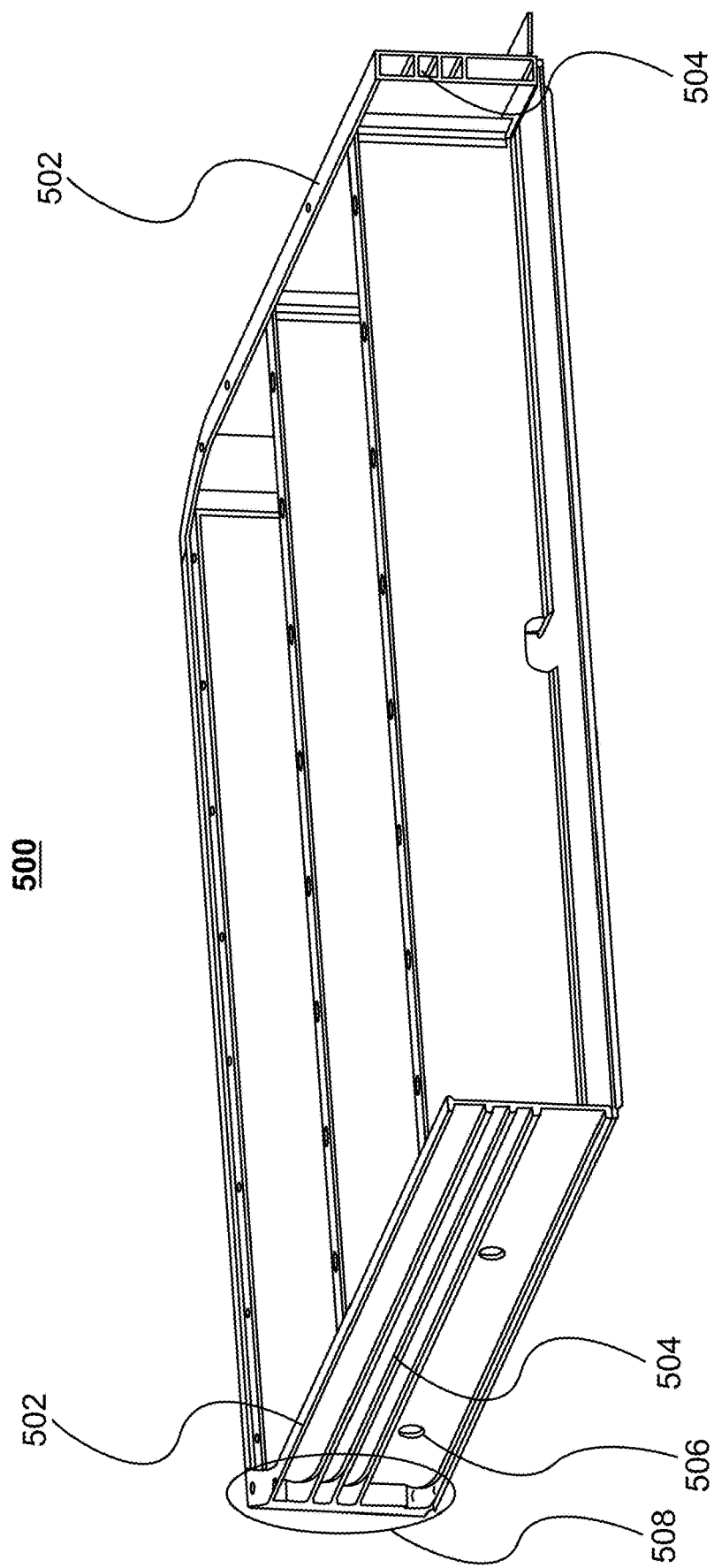
FIGS. 5A-5C show various views of an illustrative battery cell pack showing a cross-section and/or cutaway of the siderail in accordance with at least some embodiments of the present disclosure.

FIG. 5A illustrates a cross-sectional view of illustrative battery cell pack assembly 500 showing a lateral cross-section of the pack and a longitudinal cross-section of the siderail in accordance with some embodiments of the present disclosure. Siderails 502 receive venting from battery cells via openings 506, which are then routed into one or more channel assemblies 504. Channel assemblies 504 run along the lateral sides of the battery cell pack assembly and allow the venting to propagate to an outlet (e.g., outlet 508) via the shown venting channels. Channel assemblies 504 have the additional benefit of providing structural support to the battery cell pack. In some embodiments, only a single channel assembly is used for venting. As illustrated, only the bottom channel is used for venting. In some embodiments, assembly 500 includes a matrix configured to hold battery cells. The matrix includes a front side (e.g., a tapered side (not shown) of assembly 500), a rear side (e.g., the side opposite of the tapered side), and two lateral sides opposite each other (e.g., siderails 502). Assembly 500 includes two channel assemblies (e.g., channel assemblies 504) that are coupled to siderails 502 and each include at least one venting channel. As used herein, an assembly coupled to a siderail includes an assembly integrated into the siderail. Assembly 500 includes outlets (e.g., outlet 508) that are each coupled to a respective channel assembly. Although not depicted in FIG. 5A, an outlet may also be included in the channel assembly that is on the lateral side opposite to that of the lateral side associated with outlet 508 and proximate to the rear side.

Figure 5B:
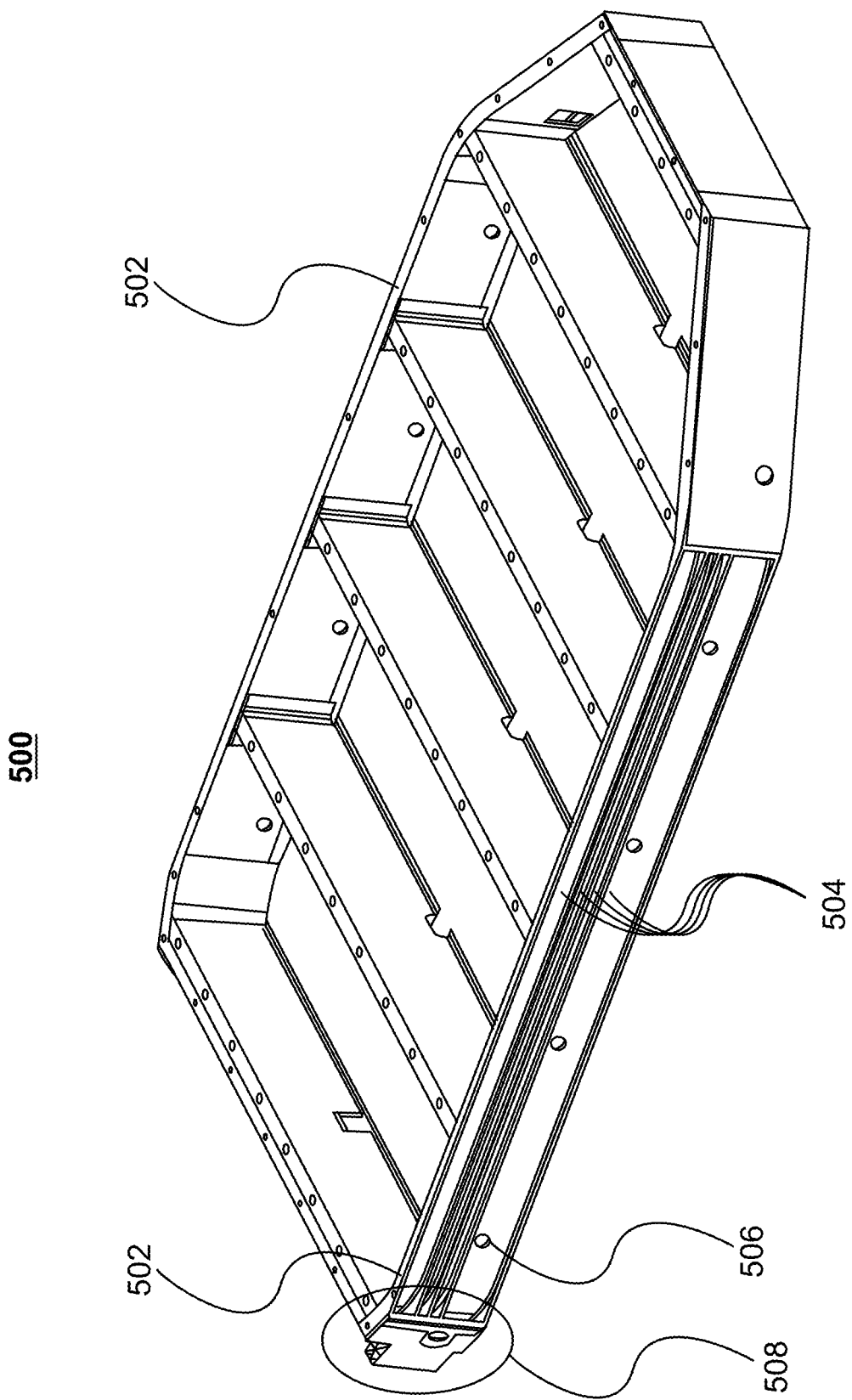

FIG. 5B is a perspective view of illustrative battery cell pack assembly 500 showing a longitudinal cross-section of the siderail in accordance with some embodiments of the present disclosure. FIG. 5B illustrates openings 506 being in each cavity defined by the inner walls of the battery cell pack. FIG. 5B additionally illustrates possible front and rear venting egress locations in the siderails. Outlet 508 is a rear venting location. A front venting location, in some embodiments, is on the same lateral side as that of outlet 508 and proximate to the front side. Venting is propagated out of the matrix through openings 506, into channel assemblies 504 of siderails 502, and finally, out of assembly 500 through outlets such as outlet 508.

Figure 5C:
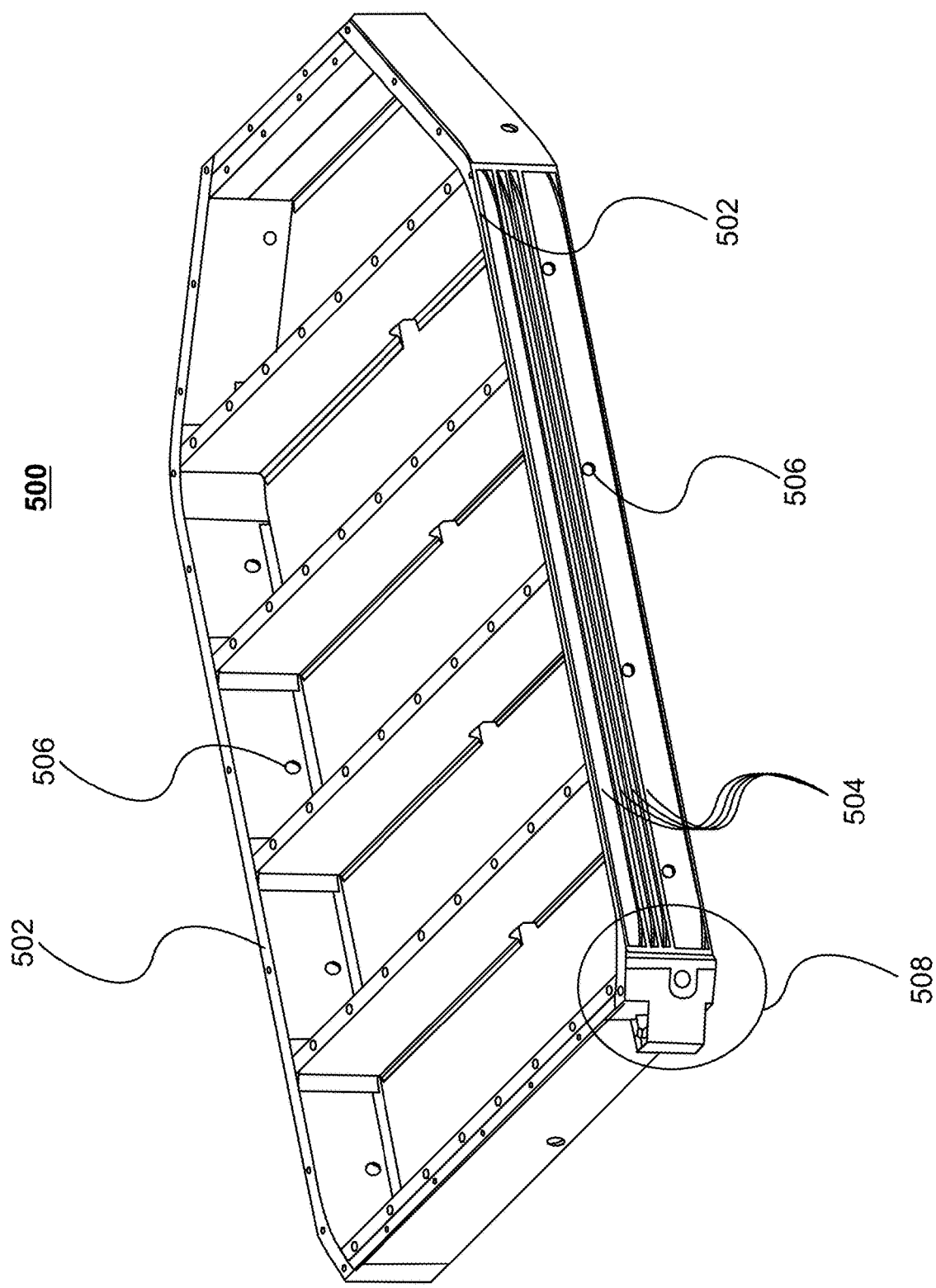

FIG. 5C is another perspective view of illustrative battery cell pack assembly 500 showing a cross-section of the siderail in accordance with at least some embodiments of the present disclosure. Battery cells are arranged between internal walls of assembly 500 such that the venting of battery cells within a cavity defined by the internal walls is confined to between two consecutive walls. The consecutive walls, in some embodiments, comprise a wall opening configure to receive a current collector. The battery cells within a cavity may be arranged within battery modules that arranged in back to back configuration. The openings at the bottom of each internal wall are to accommodate battery cell connections (e.g., current collector) and other connections (e.g., a cooling manifold) that run through the battery cell pack. Those connections will effectively block these holes and help to prevent venting from going through them. Openings 506 located at the lateral sides of the matrix of assembly 500 allow vented material to propagate out of the matrix cavities through channel assemblies 504 of siderails 502. Vented material is propagated out of channel assemblies through outlets such as outlet 508. In some embodiments, dips in the pack lid and other obstructions are used to further isolate the lateral sides of a matrix cavity from each other. For example, when the battery cells are arranged in back to back battery modules, obstructions may be used proximate to the back ends of the battery modules to limit the amount of venting that passes the back end of a battery module. In such embodiments, the venting of a battery cell primarily passes through the matrix cavity opening that is on the same side as venting battery cell.

Methods are described herein for venting gas in a battery module of an assembly (e.g., assembly 500). Battery cells are vented into a respective opening of openings in a matrix of the assembly. For example, battery cells located in a cavity of a matrix, separated by inner walls of an assembly, that vent flammable gas are vented through openings (e.g., openings 506) for each cavity and located at the lateral sides (e.g., siderails 502) of the matrix. The vented material is caused to be propagated into at least one venting channel of channel assemblies (e.g., channel assemblies 504) of the lateral sides. The vented material is further caused to be propagated to and out of outlets (e.g., outlet 508) located proximate to the rear or front sides of the matrix.

It will be understood that, while the present disclosure discusses a particular architecture of a battery cell pack, that the teaching contained herein are applicable to any other suitable type of battery cell pack architecture. For example, the battery cell pack illustrated herein may be most applicable to an automobile application. The battery cell pack may be of any other suitable shape, size, and/or arrangement in order to be more applicable in other applications without departing from the scope of the present disclosure.

What is claimed is:
1. An assembly, comprising:
a matrix configured to hold a plurality of battery cells, the matrix comprising a front side, a rear side, and two lateral sides opposite each other, wherein each of the plurality of battery cells is configured to vent out of an end;
a cover layer having a strength of less than 1 megapascal at 100 degrees Celsius and arranged in front of the plurality of battery cells such that venting of a battery cell is configured to damage and pass through the cover layer;
a lid layer, arranged in front of the cover layer, that is configured to withstand the venting that passes through the cover layer;
a channel assembly coupled to one of the lateral sides comprising at least one venting channel; and
an outlet coupled to the channel assembly, wherein:
the matrix comprises a plurality of openings along the one lateral side,
the plurality of battery cells arranged to vent into the plurality of openings,
the channel assembly interfaces with the plurality of openings such that venting from the matrix propagates into the at least one venting channel, and
the channel assembly and the outlet are configured to cause venting to propagate out of the outlet.

2. The assembly of claim 1, wherein the one lateral side comprises a first lateral side, the channel assembly comprises a first channel assembly, the outlet comprises a first outlet, the plurality of openings comprises a first plurality of openings, and the matrix comprises a second plurality of openings along the second lateral side, the assembly further comprising:
a second channel assembly coupled to a second lateral side of the two lateral sides, wherein the second channel assembly comprises at least one venting channel and the second channel assembly interfaces with the second plurality of openings such that venting from the matrix propagates into the at least one venting channel of the second channel assembly; and
a second outlet, the second outlet coupled to the second channel assembly, wherein the second channel assembly and the second outlet are configured to cause venting to propagate out of the second outlet.

3. The assembly of claim 2, wherein the first and second outlets are arranged on respective ones of the first and second lateral sides, proximate to the rear side.

4. The assembly of claim 2, wherein the first and second outlets are arranged on respective ones of the first and second lateral sides, proximate to the front side.

5. The assembly of claim 4, further comprising two additional outlets, each coupled to a respective one of the first and second channel assemblies, the two additional outlets are arranged on respective ones of the first and second lateral sides, proximate to the rear side.

6. The assembly of claim 2, wherein the matrix further comprises a plurality of walls, each extending from the first lateral side to the second lateral side, wherein the plurality of walls are arranged such that at least one battery cell of the plurality of battery cells is arrangeable between two consecutive walls, and wherein venting of the at least one battery cell is substantially confined to between the two consecutive walls.

7. The assembly of claim 6, wherein the consecutive walls each comprise a wall opening configured to receive a current collector.

8. The assembly of claim 6, wherein the at least one battery cell comprises two battery cells arrangeable between the consecutive walls back to back.

9. The assembly of claim 2, wherein each of the first and second pluralities of openings are configured to be one-way ports that direct venting outwardly.

10. The assembly of claim 2, wherein the assembly further comprises a plastic spacer configured to maintain a plurality of relative positions of the plurality of battery cells.

11. A battery cell pack assembly, comprising:
a plurality of battery cells, each comprising a front end and a back end, wherein each of the plurality of battery cells are configured such that venting propagates out of the front end;
a cover layer having a strength of less than 1 megapascal at 100 degrees Celsius and arranged in front of the plurality of battery cells such that venting of a battery cell is configured to damage and pass through the cover layer;
a lid layer, arranged in front of the cover layer, that is configured to withstand the venting that passes through the cover layer; and
a venting assembly comprising two lateral sides opposite each other configured to receive venting from any of the plurality of battery cells and to direct the venting outward of the battery cells and along the two lateral sides.

12. The battery cell pack assembly of claim 11, wherein the cover layer is made of plastic having a thickness of 0.5 millimeters.

13. The battery cell pack assembly of claim 12, wherein the venting is configured to propagate out of the front end of the battery, through the cover layer, and towards the lid layer in a first direction and wherein the lid layer is configured to redirect the venting in a second direction.

14. A method for venting gas in a battery module through an assembly comprising a matrix configured to hold a plurality of battery cells, a channel assembly, and an outlet, the method comprising:
directing venting gas of a ventilating battery cell of the plurality of battery cells towards a cover layer having a strength of less than 1 megapascal at 100 degrees Celsius such that the cover layer is damaged and the venting gas passes through the cover layer towards a lid layer;
redirecting, using the lid layer, the venting gas towards a side of the matrix;
causing the venting gas to propagate from the matrix to the channel assembly via a respective opening in the matrix; and
causing the venting gas to propagate through the channel assembly through the outlet.

15. The method of claim 14, wherein the matrix comprises a front side, a rear side, and two lateral sides opposite each other.

16. The method of claim 15, wherein the channel assembly comprises a first channel assembly, and wherein the first assembly and a second channel assembly are each coupled to a respective one of the two lateral sides.

17. The method of claim 15, wherein the assembly comprises a plurality of openings along the two lateral sides.

18. The method of claim 15, wherein the matrix comprises a plurality of walls, each extending from one of the two lateral sides to another of the two lateral sides, wherein the plurality of walls are arranged such that at least one battery cell of the plurality of battery cells is arrangeable between two consecutive walls, and wherein venting of the at least one battery cell is substantially confined to between the two consecutive walls.

19. The method of claim 18, wherein the at least one battery cell comprises two battery cells arrangeable between the consecutive walls back to back.

20. The method of claim 14, wherein the respective opening is configured to be a one-way port that directs venting outwardly.

\* \* \* \* \*